(12) United States Patent
Sato et al.

(10) Patent No.: US 11,994,730 B2
(45) Date of Patent: May 28, 2024

(54) OPTICAL FIBER CABLE

(71) Applicant: SUMITOMO ELECTRIC INDUSTRIES, LTD., Osaka (JP)

(72) Inventors: Fumiaki Sato, Osaka (JP); Yohei Suzuki, Osaka (JP); Kenta Tsuchiya, Osaka (JP); Yuuki Shimoda, Osaka (JP); Taro Fujita, Osaka (JP); Ryota Fukumoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/907,604

(22) PCT Filed: Jun. 28, 2021

(86) PCT No.: PCT/JP2021/024375
§ 371 (c)(1),
(2) Date: Sep. 28, 2022

(87) PCT Pub. No.: WO2022/004666
PCT Pub. Date: Jan. 6, 2022

(65) Prior Publication Data
US 2023/0142376 A1 May 11, 2023

(30) Foreign Application Priority Data
Jun. 29, 2020 (JP) .................................. 2020-111836

(51) Int. Cl.
*G02B 6/44* (2006.01)
(52) U.S. Cl.
CPC ......... *G02B 6/4436* (2013.01); *G02B 6/4432* (2013.01); *G02B 6/4433* (2013.01)

(58) Field of Classification Search
CPC ............................ G02B 6/4432; G02B 6/4433
See application file for complete search history.

(56) References Cited

U.S. PATENT DOCUMENTS 6,049,647 A * 4/2000 Register ............... G02B 6/4416
385/100
9,728,302 B1 * 8/2017 McNutt ................ G02B 6/4436
(Continued)

FOREIGN PATENT DOCUMENTS

CN      102115596 A  *  7/2011
CN      202285053 U     6/2012
(Continued)

OTHER PUBLICATIONS

JP 2005208430 A English translation (Year: 2004).*
(Continued)

*Primary Examiner* — Charlie Y Peng
(74) *Attorney, Agent, or Firm* — Pearne & Gordon LLP (57) ABSTRACT

An optical fiber cable includes a plurality of optical fibers, a tensile strength member set that is disposed along the plurality of optical fibers in a longitudinal direction of the optical fiber cable, and a sheath that covers the plurality of optical fibers from outside and encloses the tensile strength member set in the sheath. In the optical fiber cable, at least four tensile strength member sets are embedded in the sheath in a state where the four tensile strength member sets are apart from each other in a radial direction of the optical fiber cable, the sheath includes a flame-retardant inorganic substance and a release agent, and a distance from one of the four tensile strength member sets to a surface layer of the sheath is 0.5 mm or more.

8 Claims, 7 Drawing Sheets (56) References Cited

U.S. PATENT DOCUMENTS

| | | |
|---|---|---|
| 2010/0322572 A1 | 12/2010 | Sakabe et al. |
| 2011/0110635 A1 | 5/2011 | Toge et al. |
| 2012/0020632 A1 | 1/2012 | Shiobara et al. |
| 2015/0226928 A1 | 8/2015 | Ceschiat et al. |
| 2015/0370026 A1* | 12/2015 | Hudson, II ............ G02B 6/4433 385/113 |
| 2017/0153404 A1 | 6/2017 | Takeda et al. |
| 2018/0180831 A1* | 6/2018 | Blazer ................. G02B 6/4403 |
| 2021/0223491 A1 | 7/2021 | Shimizu et al. |
| 2022/0171146 A1 | 6/2022 | Shimizu et al. |

FOREIGN PATENT DOCUMENTS

| | | | |
|---|---|---|---|
| DE | 202004011064 U1 * | 11/2005 | |
| JP | H04-089903 U | 8/1992 | |
| JP | 05174637 A * | 7/1993 | |
| JP | 2005208430 A * | 8/2005 | |
| JP | 2006-330265 A | 12/2006 | |
| JP | 2009-181119 A | 8/2009 | |
| JP | 2010-008923 A | 1/2010 | |
| JP | 2014-071441 A | 4/2014 | |
| JP | 2015-517679 A | 6/2015 | |
| JP | 2015-169756 A | 9/2015 | |
| JP | 2016-080747 A | 5/2016 | |
| KR | 20100089280 A * | 8/2010 | |
| WO | 2010-087329 A1 | 8/2010 | |
| WO | 2013-165407 A1 | 11/2013 | |
| WO | 2020-075734 A1 | 4/2020 | |

OTHER PUBLICATIONS

CN 102115596 A English translation (Year: 2011).*
DE 202004011064 U1 English translation (Year: 2005).*
JP 05174637 A English translation (Year: 1993).*
International Search Report dated Sep. 7, 2021 issued in PCT/JP2021/024375.
Written Opinion dated Sep. 7, 2021 issued in PCT/JP2021/024375.

* cited by examiner

OPTICAL FIBER CABLE

TECHNICAL FIELD

The present disclosure relates to an optical fiber cable.

The present application is based on and claims priority from Japanese Patent Application No. 2020-111836 filed on Jun. 29, 2020, the disclosure of which is hereby incorporated by reference herein in its entirety.

BACKGROUND ART

In the related art, as a trunk optical fiber cable or a micro duct cable wired to a thin pipe by air pressure feeding, a loose tube-type cable in which optical fiber units each obtained by bundling a plurality of optical fibers are respectively covered with a resin tube and are covered with a cable sheath is known. Further, a slotless cable in which a resin tube is omitted and optical fibers are mounted in a cable sheath at a high density is also known (for example, Patent Literatures 1, 2, and 3).

CITATION LIST

Patent Literature

Patent Literature 1: JP-T-2015-517679
Patent Literature 2: JP-A-2010-008923
Patent Literature 3: JP-A-2014-071441

SUMMARY OF INVENTION

In order to solve the above problem, an optical fiber cable according to the present disclosure includes:
 a plurality of optical fibers;
 a tensile strength member set that is disposed along the plurality of optical fibers; and
 a sheath that covers the plurality of optical fibers from outside and encloses the tensile strength member set therein,
 at least four tensile strength member sets are embedded in the sheath in a manner of being apart from each other,
 the sheath contains a flame-retardant inorganic substance and a release agent, and
 a distance from one of the tensile strength member sets to a surface layer of the sheath is 0.5 mm or more.

Further, an optical fiber cable according to the present disclosure includes:
 a plurality of optical fibers;
 a tensile strength member set that are disposed along the plurality of optical fibers; and
 a sheath that covers the plurality of optical fibers from outside and encloses the tensile strength member set therein,
 at least four tensile strength member sets are embedded in the sheath in a manner of being apart from each other,
 the sheath includes an outer layer and an inner layer,
 the inner layer contains a flame-retardant inorganic substance, and
 the outer layer contains a release agent.

DESCRIPTION OF EMBODIMENTS

Technical Problem

The loose tube-type cable includes a tension member at a center thereof. Therefore, wiring based on air pressure feeding is easy without anisotropy in a bending direction. However, in general, a film of the resin tube covering the optical fiber unit is formed to be thick. Therefore, it is difficult to reduce an outer diameter of the loose tube-type cable and to mount the optical fibers at a high density.

On the other hand, since the slotless cable does not include a resin tube, the optical fibers may be mounted at a high density. However, in the slotless cable, since a plurality of tension members are embedded in the sheath, rigidity of the cable is not uniform depending on positions where the tension members are embedded. As a result, anisotropy in the bending direction is generated, and buckling may occur at the time of air pressure feeding.

In recent years, there has been an increasing demand for a flame-retardant and low-smoking micro duct cable due to strengthening of regulations on buildings. In order to satisfy the requirement of flame retardance, a flame-retardant resin is used for the optical fiber cable. However, since the flame-retardant resin is generally formed of a soft material having a high friction coefficient, it is difficult to satisfy a low friction property required for the air pressure feeding.

The present disclosure provides a flame-retardant optical fiber cable that enables easy wiring based on air pressure feeding.

DESCRIPTION OF EMBODIMENT OF PRESENT DISCLOSURE

First, an embodiment of the present disclosure will be listed and described.

(1) An optical fiber cable according to an aspect of the present disclosure includes:
 a plurality of optical fibers;
 a tensile strength member set that is disposed along the plurality of optical fibers; and
 a sheath that covers the plurality of optical fibers from outside and encloses the tensile strength member set therein,
 at least four tensile strength member sets are embedded in the sheath in a manner of being apart from each other,
 the sheath contains a flame-retardant inorganic substance and a release agent, and
 a distance from one of the tensile strength member sets to a surface layer of the sheath is 0.5 mm or more.

According to the optical fiber cable of the present disclosure, since the sheath contains the flame-retardant inorganic substance, a flame-retardant optical fiber cable may be provided. Since the sheath contains the release agent, wiring based on air pressure feeding is facilitated. Further, since at least four tensile strength member sets are embedded in the sheath in a manner of being apart from each other, unevenness in rigidity of the cable due to positions where the tensile strength member sets are embedded is improved, and the cable is less likely to buckle during air pressure feeding.

In general, the tensile strength member is made of a combustible material. When the tensile strength member is embedded in the vicinity of the surface layer of the sheath, flame retardance of the optical fiber cable decreases. However, in the present disclosure, since the distance from one tensile strength member set to the surface layer of the sheath is 0.5 mm or more, the flame retardance of the optical fiber cable is improved.

(2) The tensile strength member set may be one tensile strength member or two tensile strength members that are paired.

According to the present disclosure, since the tensile strength member set is one tensile strength member or two tensile strength members that are paired, rigidity of the optical fiber cable is maintained. In the case where the tensile strength member set is two tensile strength members that are paired, the rigidity of the optical fiber cable is further increased.

(3) The sheath may contain magnesium hydroxide or aluminum hydroxide as the flame-retardant inorganic substance.

According to the present disclosure, since the sheath contains magnesium hydroxide or aluminum hydroxide as the flame-retardant inorganic substance, the flame retardance of the optical fiber cable is improved.

(4) The tensile strength member sets may be arranged at equal intervals.

According to the present disclosure, since four or more tensile strength member sets are disposed at equal intervals, unevenness in rigidity of the cable due to positions where the tensile strength member sets are disposed is improved, and the cable is less likely to buckle during air pressure feeding.

(5) The optical fiber cable may further include at least one fibrous filler arranged along the plurality of optical fibers.

The tensile strength member sets may be arranged in line symmetry with respect to a straight line connecting the fibrous filler and a center of the optical fiber cable in a cable cross-sectional view.

Since the optical fiber cable of the present disclosure includes the fibrous filler, the optical fibers may be easily taken out from the optical fiber cable. Further, since four or more tensile strength member sets are arranged in line symmetry with respect to the straight line connecting the fibrous filler and the center of the optical fiber cable, the unevenness in rigidity of the cable is improved, and the cable is less likely to buckle during air pressure feeding.

(6) The optical fiber cable may further include an upper wound tape that covers the plurality of optical fibers from outside.

The upper wound tape may contain the flame-retardant inorganic substance.

The upper wound tape is disposed between the sheath and the plurality of optical fibers.

According to the present disclosure, since the upper wound tape containing the flame-retardant inorganic substance is disposed between the sheath and the plurality of optical fibers, the flame retardance of the optical fiber cable is further improved.

(7) An optical fiber cable according to another aspect of the present disclosure includes:
    a plurality of optical fibers;
    a tensile strength member set that are disposed along the plurality of optical fibers; and
    a sheath that covers the plurality of optical fibers from outside and encloses the tensile strength member set therein,
    at least four tensile strength member sets are embedded in the sheath in a manner of being apart from each other,
    the sheath includes an outer layer and an inner layer,
    the inner layer contains a flame-retardant inorganic substance, and
    the outer layer contains a release agent.

According to the present disclosure, since the inner layer of the sheath contains the flame-retardant inorganic substance, flame retardance of the optical fiber cable may be improved. Further, since the outer layer of the sheath contains the release agent, wiring based on air pressure feeding is facilitated.

(8) A distance from one of the tensile strength member sets to a surface layer of the outer layer may be 0.5 mm or more.

According to the present disclosure, since the distance from one of the tensile strength member sets to the surface layer of the outer layer is 0.5 mm or more, the flame retardance of the optical fiber cable is improved.

(9) The optical fiber cable includes:
    the plurality of optical fibers in a form of an intermittent-connection-type optical fiber ribbon in which, in a state where the plurality of optical fibers are arranged adjacently in a direction orthogonal to a longitudinal direction of the plurality of optical fibers, a connected portion in a state where adjacent optical fibers are connected and a non-connected portion in a state where adjacent optical fibers are not connected are intermittently provided in the longitudinal direction in a part or all of the plurality of optical fibers.

Since the optical fiber cable of the present disclosure may also use the optical fiber ribbon of intermittent connection type, the optical fiber cable has an excellent cable accommodation property and enables easy single-core separation.

Advantageous Effects of Invention

According to the present disclosure, a flame-retardant optical fiber cable that enables easy wiring based on air pressure feeding may be provided.

DETAILS OF EMBODIMENTS OF PRESENT DISCLOSURE

A specific example of an optical fiber cable according to an embodiment of the present disclosure will be described with reference to the drawings.

The present disclosure is not limited to these examples but defined by the scope of the claims, and is intended to include all modifications within the scope and meaning equivalent to the scope of the claims.

First Embodiment

An optical fiber cable 1A according to a first embodiment will be described with reference to FIGS. 1 and 2.

Figure 1:
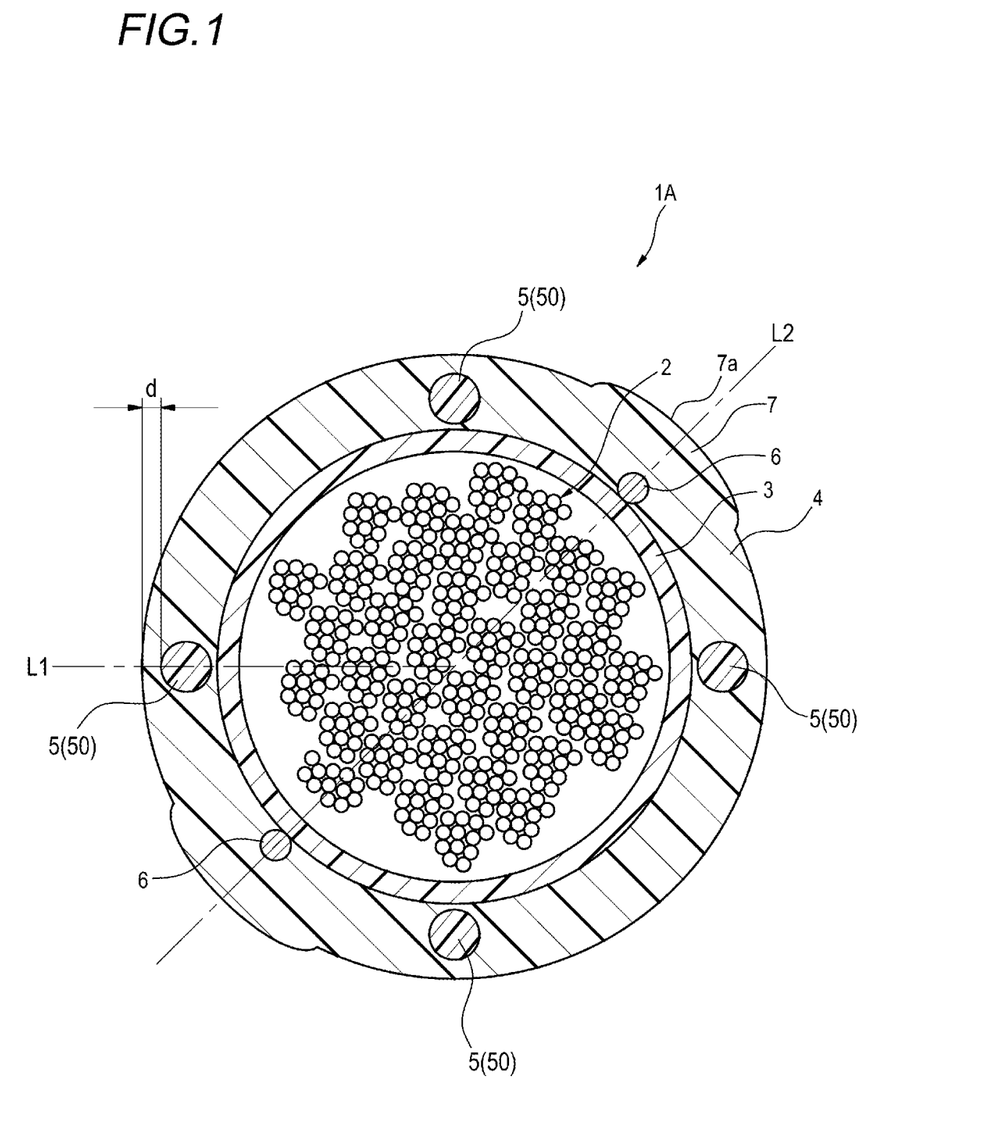
FIG. 1 is a cross-sectional view of an optical fiber cable according to a first embodiment.

FIG. 1 is a cross-sectional view perpendicular to a longitudinal direction of the optical fiber cable 1A. As shown in FIG. 1, the optical fiber cable 1A includes a plurality of optical fibers in a form of a plurality of optical fiber ribbons 2, a water absorbing tape 3 covering a periphery of the optical fiber ribbons 2, a sheath 4 covering the periphery of the water absorbing tape 3, tensile strength members 5 (tensile strength member sets 50) embedded in the sheath 4, at least one tearing string 6 (fibrous filler), and a plurality of protrusions 7. A cable outer diameter of the optical fiber cable 1A is, for example, 14 mm.

The water absorbing tape 3 is wound around the entire periphery of the plurality of optical fiber ribbons 2, for example, longitudinally or spirally. The water absorbing tape 3 is, for example, a tape obtained by performing water absorption processing by adhering water absorbing powders to a base cloth made of polyester or the like. A thickness of the water absorbing tape 3 is, for example, 0.3 mm. In the present embodiment, the optical fiber cable 1A includes the water absorbing tape 3, but the optical fiber cable 1A may not include the water absorbing tape 3.

The sheath 4 is provided to cover the plurality of optical fiber ribbons 2 from outside and to enclose the tensile strength members 5 (tensile strength member sets 50) therein. A thickness of the sheath 4 is, for example, 1.5 mm. The sheath 4 is mainly made of, for example, a vinyl resin such as polyvinyl chloride (PVC) or a polyolefin resin such as polyethylene (PE). Further, the sheath 4 contains a flame-retardant inorganic substance and a release agent. Examples of the flame-retardant inorganic substance include magnesium hydroxide and aluminum hydroxide. Examples of the release agent include silicon-based release agents such as silicon or siloxane.

The tensile strength members 5 are disposed in the longitudinal direction of the optical fiber cable 1A along the plurality of optical fiber ribbons 2, and are provided to be embedded in the sheath 4. A diameter of the tensile strength member 5 is, for example, 0.5 mm. The tensile strength member 5 is made of, for example, fiber-reinforced plastic (FRP) such as aramid FRP, glass FRP, or carbon FRP. The tensile strength member 5 may be made of a liquid crystal polymer. The tensile strength member 5 is preferably non-inductive. The fiber-reinforced plastic (FRP) is generally a combustible material. From the viewpoint of improving flame retardance of the entire optical fiber cable 1A, it is preferable that the tensile strength members 5 are disposed inside the sheath 4 at a position close to a center of the optical fiber cable 1A, but not in the vicinity of a surface layer of the sheath 4.

The tensile strength member 5 is formed to have a radial cross section of a circular shape. In the optical fiber cable 1A, at least four (four in the present example) tensile strength members 5 are provided. As to be described later, in the present disclosure, the plurality of tensile strength members 5 may be provided such that every two tensile strength members are paired. In the following description, one tensile strength member 5 or two tensile strength members 5 that are paired are collectively referred to as the tensile strength member set 50.

The tensile strength member set 50 may be a set including three tensile strength members 5 or four or more tensile strength members 5.

In the present example, four tensile strength member sets 50 are embedded in the sheath 4 in a manner of being apart from each other. In the optical fiber cable 1A, four tensile strength members 5 (four tensile strength member sets 50) are arranged at equal intervals. Specifically, in the radial cross section of the optical fiber cable 1A, the four tensile strength members 5 (tensile strength member sets 50) are provided at positions facing each other across a center of the optical fiber cable 1A. The four tensile strength members 5 (the tensile strength member sets 50) in the radial cross section of the optical fiber cable 1A are arranged such that two straight lines each connecting the facing tensile strength members 5 (the tensile strength member sets 50) are orthogonal to each other.

In the present example, a distance d from a position on an outer periphery of one tensile strength member 5 (tensile strength member set 50) to the surface layer of the sheath 4 is 0.5 mm or more. Here, the position on the outer periphery of the tensile strength member 5 is a position at which a straight line L1 connecting the center of the optical fiber cable 1A and a center of the tensile strength member 5 intersects with the outer periphery of the tensile strength member 5 on a cable outer peripheral side in the cable cross-sectional view. In the present example, the distance d is 0.5 mm or more for each of all the tensile strength members 5 (tensile strength member sets 50).

The tearing string 6 is provided to tear the sheath 4, and is disposed inside the sheath 4 along the plurality of optical fiber ribbons 2 in the longitudinal direction of the optical fiber cable 1A. In the present example, two tearing strings 6 are provided. The two tearing strings 6 are provided to face each other such that each is at a substantially intermediate position between adjacent tensile strength members 5 (tensile strength member sets 50). In addition, the four tensile strength members 5 (tensile strength member sets 50) are arranged in line symmetry with respect to a straight line L2 connecting the tearing strings 6 and the center of the optical fiber cable 1A in the cable cross-sectional view. An operator may tear the sheath 4 in the longitudinal direction and take out the optical fiber ribbons 2 by pulling out the tearing strings 6. The tearing string 6 is fibrous, and is made of, for example, a plastic material (for example, polyester) resistant to tension.

A plurality of (two in the present example) protrusions 7 are provided. The two protrusions 7 are provided along the longitudinal direction of the optical fiber cable 1A. Each of the protrusions 7 may be provided continuously or intermittently along the longitudinal direction. In addition, the two protrusions 7 are provided to face each other across the center of the optical fiber cable 1A in a peripheral direction of an outer peripheral portion of the sheath 4 in the radial cross section of the optical fiber cable 1A. In the present example, the protrusions 7 are provided on the straight line L2 connecting the tearing strings 6 and the center of the optical fiber cable 1A. The protrusion 7 is formed on the outer peripheral portion of the sheath 4 in a state of protruding in the radial direction of the optical fiber cable 1A. A surface 7a of the protrusion 7 in a protruding direction is formed as a curved surface. The protrusions 7 are formed integrally with the sheath 4 by extrusion molding.

Figure 2:
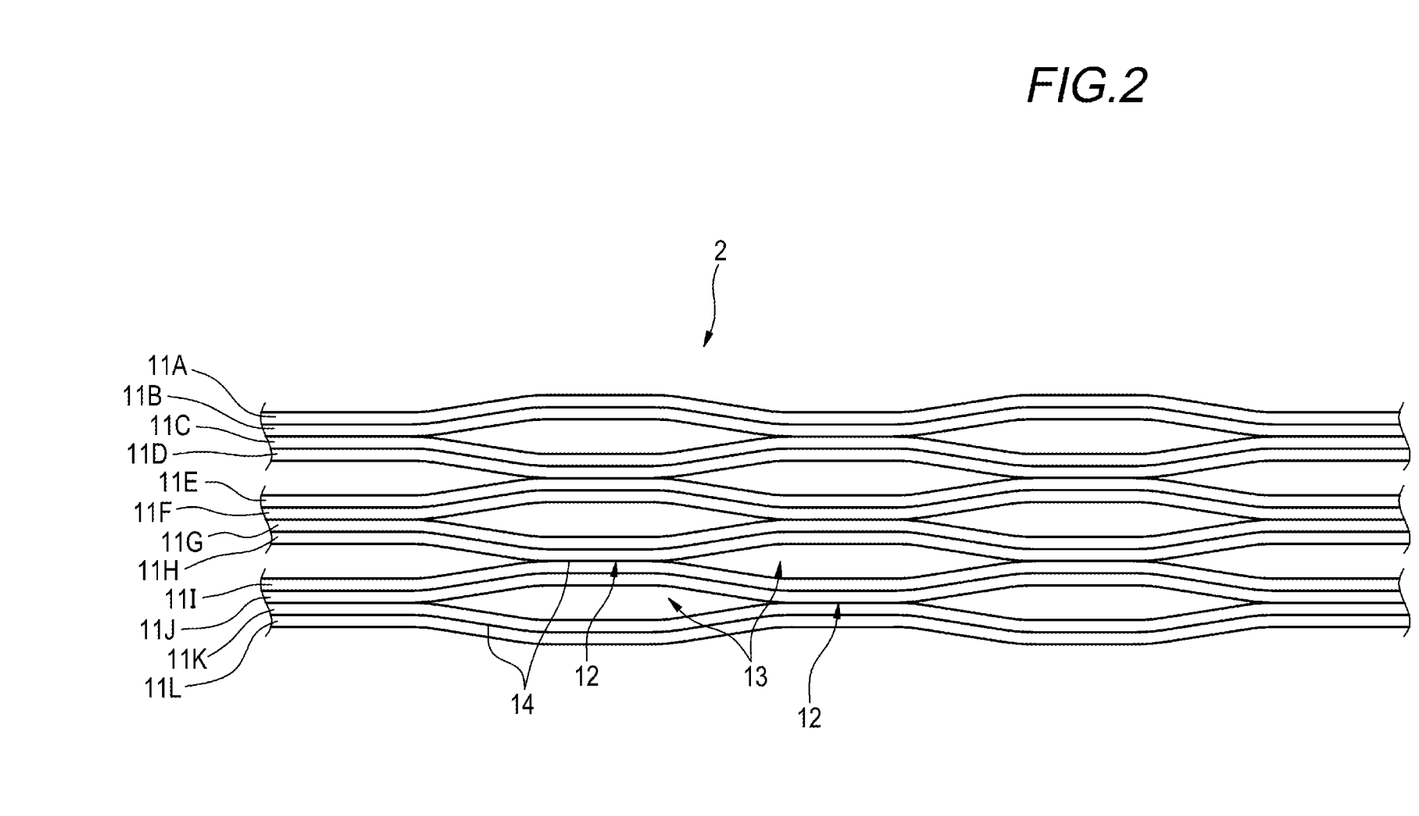
FIG. 2 is a partially developed view showing an optical fiber ribbon accommodated in the optical fiber cable in a longitudinal direction thereof.

FIG. 2 is a partially developed view showing the optical fiber ribbons 2 accommodated in the optical fiber cable 1A in the longitudinal direction thereof. As shown in FIG. 2, the optical fiber ribbon 2 is an intermittent-connection-type optical fiber ribbon in which, in a state where a plurality of optical fibers 11A to 11L are arranged adjacently in a direction orthogonal to the longitudinal direction, connected portions 12 at each of which adjacent optical fibers are connected and non-connected portions 13 at each of which adjacent optical fibers are not connected are intermittently provided in the longitudinal direction in a part or all of the plurality of optical fibers 11A to 11L. An outer diameter of each of the optical fibers 11A to 11L is, for example, 200 μm, and may be 250 μm or 180 μm.

In the optical fiber ribbon 2 of the present example, 12 optical fibers 11A to 11L are arranged adjacently. The connected portion 12 and the non-connected portion 13 may be intermittently provided between a part of the optical fibers (intermittently provided between every two optical fibers) as shown in FIG. 2, or between all of the optical fibers (intermittently provided every one optical fiber). FIG. 2 shows an example in which the connected portion 12 and the non-connected portion 13 are intermittently provided between every two fibers, and the non-connected portion 13 is not provided between the optical fibers 11A and 11B, 11C and 11D, 11E and 11F, 11G and 11H, 11I and 11J, and 11K and 11L.

The connected portion 12 in the optical fiber ribbon 2 is formed by applying a connecting resin 14 made of, for example, an ultraviolet curable resin, or a thermosetting resin between the optical fibers. By applying the connecting resin 14 between predetermined optical fibers, the connected portions 12 and the non-connected portions 13 are intermittently provided, and the optical fibers 11A to 11L are integrated adjacently. The connecting resin 14 may be applied to only one side of the adjacent surfaces formed by the optical fibers 11A to 11L arranged adjacently, or may be applied to both sides. In addition, the optical fiber ribbon 2 may be manufactured such that, for example, a tape resin is applied to one surface or both surfaces of all of the optical fibers 11A to 11L arranged adjacently, all of the optical fibers 11A to 11L are connected, and then a part of the optical fibers are cleaved by a rotary blade or the like to form the non-connected portions 13.

As described above, in the present embodiment, since the sheath 4 contains the flame-retardant inorganic substance, the optical fiber cable 1A excellent in flame retardance may be provided. In addition, since the sheath 4 also contains the release agent, the optical fiber cable 1A may be smoothly fed even in a duct during air pressure feeding. Accordingly, the wiring is facilitated.

In the present embodiment, since four tensile strength member sets 50 (four tensile strength members 5) are embedded in the sheath 4 in a manner of being apart from each other, unevenness in rigidity of the cable due to the positions where the tensile strength member sets 50 are embedded is improved. Therefore, the optical fiber cable 1A which is less likely to be bent during air pressure feeding may be provided.

In general, the tensile strength member is a combustible material. When the tensile strength member is embedded in the vicinity of the surface layer of the sheath, flame retardance of the optical fiber cable decreases. However, in the present disclosure, since the distance from one tensile strength member set 50 to the surface layer of the sheath 4 is 0.5 mm or more, the flame retardance of the optical fiber cable 1A is improved.

In the present embodiment, since the tensile strength member set 50 is one tensile strength member 5 or two tensile strength members 5 that are paired, the rigidity of the optical fiber cable 1A is maintained. In a case where the tensile strength member set 50 includes the two tensile strength members 5 that are paired, the rigidity of the optical fiber cable 1A is further increased.

In the present embodiment, the sheath 4 contains the flame-retardant inorganic substance. Specifically, the sheath 4 contains magnesium hydroxide or aluminum hydroxide. Therefore, the flame retardance of the optical fiber cable 1A may be improved.

In the present embodiment, since the four tensile strength member sets 50 are arranged at equal intervals from each other, unevenness in rigidity of the cable due to the positions where the tensile strength member sets 50 are disposed is further improved. Therefore, the optical fiber cable 1A is less likely to be bent during air pressure feeding, and the wiring work may be improved.

Since the optical fiber cable 1A of the present embodiment includes the tearing strings 6 arranged along the plurality of optical fiber ribbons 2, the operator may tear the sheath 4 with the tearing strings 6 and easily take out the individual optical fiber ribbons 2. Further, since the four tensile strength member sets 50 of the optical fiber cable 1A are arranged in line symmetry with respect to the straight line L2 connecting the tearing strings 6 and the center of the optical fiber cable 1A, the unevenness in rigidity of the cable is further improved, and the wiring work during air pressure feeding is further improved.

According to the optical fiber cable 1A of the present embodiment, a plurality of protrusions 7 protruding in the radial direction of the optical fiber cable 1A are provided on the outer peripheral portion of the sheath 4. Therefore, when the optical fiber cable 1A is air pressure-fed in the duct, the protrusions 7 come into contact with an inner wall of the duct, so that a contact area between the sheath 4 and the duct may be reduced. Accordingly, friction between the sheath 4 and the duct is reduced, and a pressure feeding distance may be extended.

In FIG. 2, the intermittent-connection-type optical fiber ribbon including 12 optical fibers is shown, but the number of optical fibers is not limited thereto. In addition, the plurality of optical fibers may be in a form in which a plurality of single-core optical fibers are twisted, instead of an optical fiber ribbon.

First Modification of First Embodiment

An optical fiber cable 1B according to a first modification of the first embodiment will be described with reference to FIG. 3. The same components as those of the optical fiber cable 1A according to the first embodiment are denoted by the same reference numerals, and description thereof will be omitted.

Figure 3:
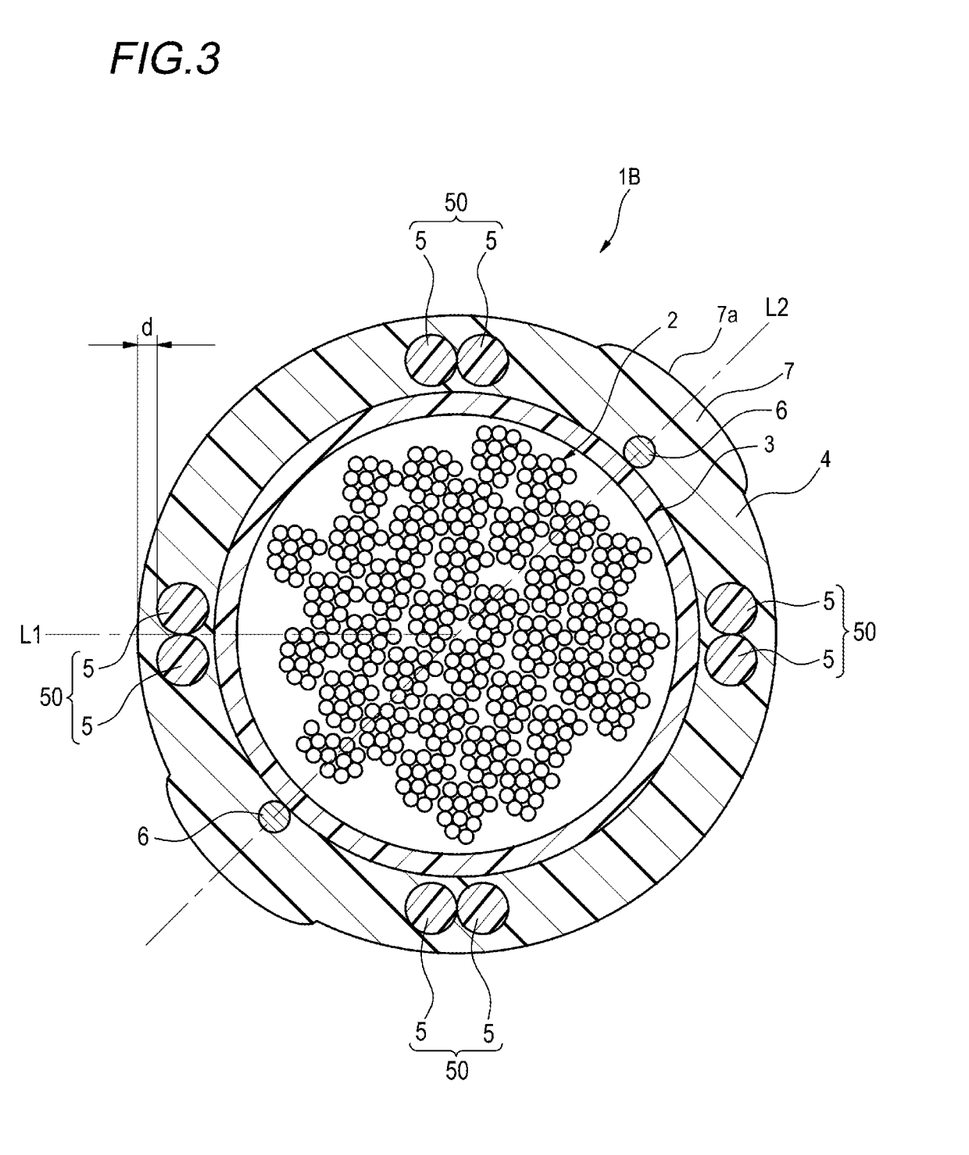
FIG. 3 is a cross-sectional view of an optical fiber cable according to a first modification of the first embodiment.

FIG. 3 is a cross-sectional view perpendicular to a longitudinal direction of the optical fiber cable 1B. The tensile strength member set 50 of the optical fiber cable 1A according to the first embodiment includes one tensile strength member 5, whereas the tensile strength member set 50 of the optical fiber cable 1B according to the first modification includes two tensile strength members 5.

At least eight (eight in the present example) tensile strength members 5 of the optical fiber cable 1B according to the first modification are provided. The eight tensile strength members 5 in the present example are provided such that every two are paired. The two tensile strength members 5 that are paired are provided, for example, in a state of being close to each other or in a state of being at least partially in contact with each other.

In the present example, four tensile strength member sets 50 are embedded in the sheath 4 in a manner of being apart from each other. The four tensile strength member sets 50 are provided into two pairs such that two tensile strength member sets 50 at positions facing each other across a center of the optical fiber cable 1B in a radial cross section of the optical fiber cable 1B are paired. The positions of the four tensile strength member sets 50 in the radial cross section of the optical fiber cable 1B are such positions that two straight lines respectively connecting the two tensile strength member sets 50 that are paired are orthogonal to each other.

In the present example, a distance d from a position on an outer periphery of one tensile strength member set 50 to a surface layer of the sheath 4 is 0.5 mm or more. Here, the position on the outer periphery of the tensile strength member set 50 is a position at which a straight line (a horizontal common normal line of the two tensile strength members 5 in FIG. 3) L1 connecting the center of the optical fiber cable 1B and a substantially intermediate position between centers of the two tensile strength members 5 in the tensile strength member set 50 intersects with a straight line (a vertical common normal line of the tensile strength members 5 in FIG. 3) which is perpendicular to the straight line and is in contact with the outer periphery on a cable outer peripheral side of each tensile strength member 5 in a cable cross-sectional view.

In the optical fiber cable 1B according to the first modification, the same effects as those of the optical fiber cable 1A according to the first embodiment may also be obtained. In particular, since the distance d from the position on the outer periphery of one tensile strength member set 50 to the surface layer of the sheath 4 is 0.5 mm or more, the flame retardance of the optical fiber cable 1B is improved.

Second Modification of First Embodiment

An optical fiber cable 1C according to a second modification of the first embodiment will be described with reference to FIG. 4. The same components as those of the optical fiber cable 1A according to the first embodiment are denoted by the same reference numerals, and description thereof will be omitted.

Figure 4:
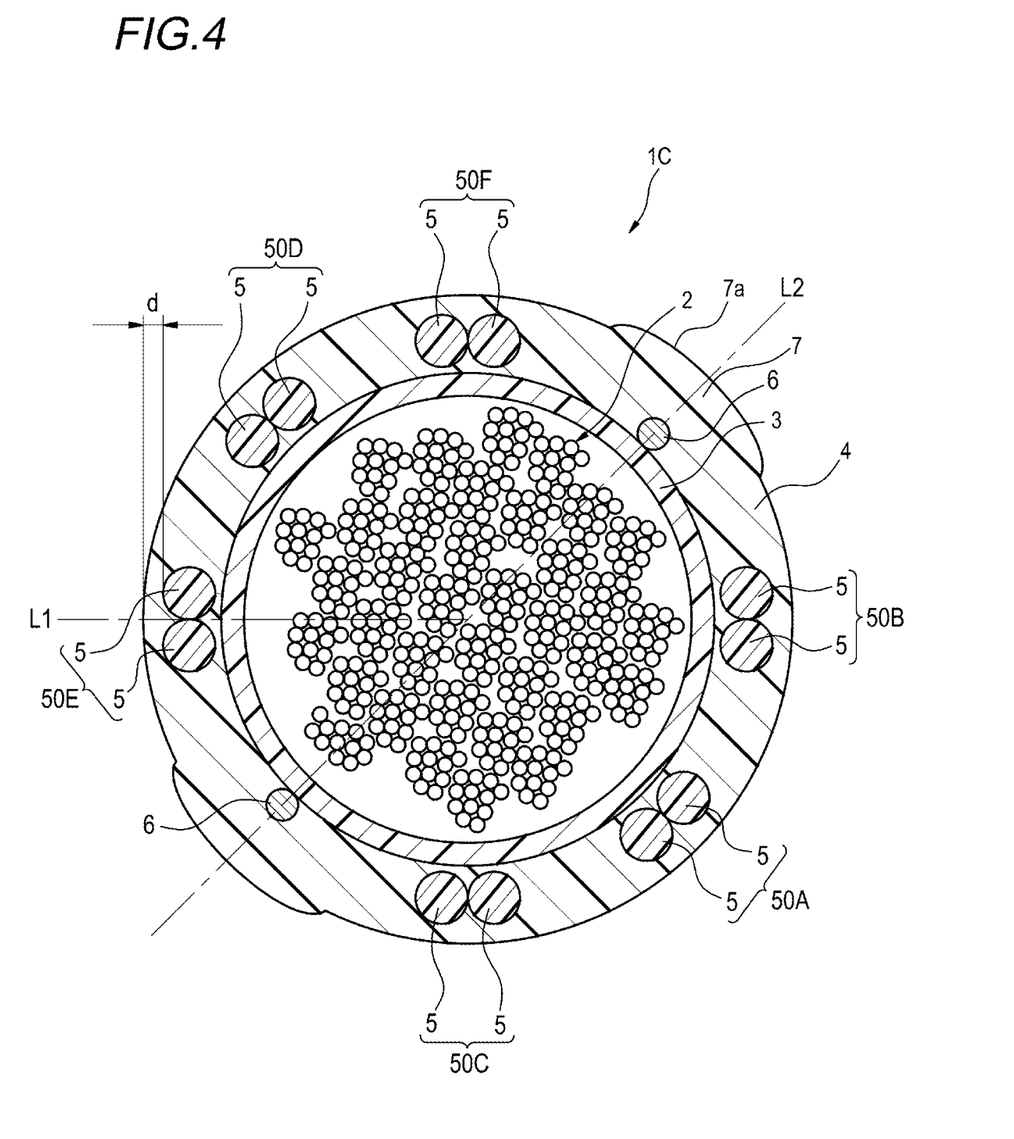
FIG. 4 is a cross-sectional view of an optical fiber cable according to a second modification of the first embodiment.

FIG. 4 is a cross-sectional view perpendicular to a longitudinal direction of the optical fiber cable 1C. As shown in FIG. 4, in addition to the configuration of the optical fiber cable 1B according to the first modification, the optical fiber cable 1C is provided with one more pair of tensile strength member sets 50 as compared with the optical fiber cable 1B.

In the optical fiber cable 1C according to the second modification, the same effects as those of the optical fiber cable 1A according to the first embodiment may also be obtained. In particular, in the present example, the three tensile strength member sets 50 (six tensile strength members 5) are arranged in line symmetry with respect to the straight line L2 connecting the tearing strings 6 and a center of the optical fiber cable 1C in a cable cross-sectional view. Three tensile strength member sets 50 on one side of the line-symmetric straight line L2 are arranged such that a distance between one tensile strength member set 50A and an adjacent tensile strength member set 50B is the same as a distance between the tensile strength member set 50A and the other adjacent tensile strength member set 50C. Similarly, three tensile strength member sets 50 on the other side of the line-symmetric straight line L2 are arranged such that a distance between one tensile strength member set 50D and an adjacent tensile strength member set 50E is the same as a distance between the tensile strength member set 50D and the other adjacent tensile strength member set 50F. As a result, unevenness in rigidity of the cable due to the positions where the tensile strength member sets 50 are disposed is further improved, and the optical fiber cable 1C is less likely to be bent during air pressure feeding, and wiring workability is improved.

In the present example, the distance d from a position on the outer periphery of one tensile strength member set 50 to a surface layer of the sheath 4 is also 0.5 mm or more.

Third Modification of First Embodiment

An optical fiber cable 1D according to a third modification of the first embodiment will be described with reference to FIG. 5. The same components as those of the optical fiber cable 1A according to the first embodiment are denoted by the same reference numerals, and description thereof will be omitted.

Figure 5:
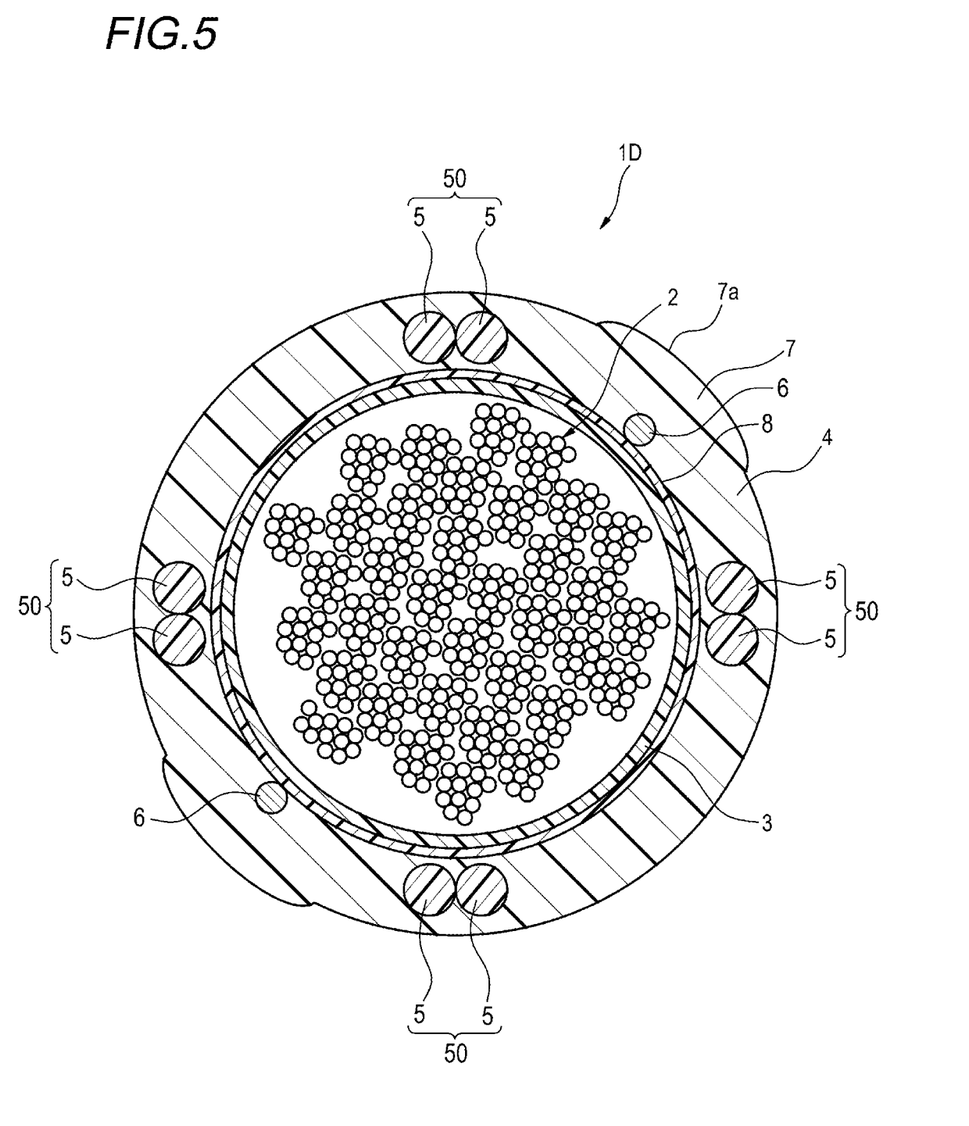
FIG. 5 is a cross-sectional view of an optical fiber cable according to a third modification of the first embodiment.

FIG. 5 is a cross-sectional view perpendicular to a longitudinal direction of the optical fiber cable 1D. As shown in FIG. 5, in addition to the configuration of the optical fiber cable 1B according to the first modification, the optical fiber cable 1D further includes an upper wound tape 8 disposed between the sheath 4 and the plurality of optical fiber ribbons 2 and covering the plurality of optical fiber ribbons 2 from outside. In the present example, the upper wound tape 8 is disposed to cover a periphery of the water absorbing tape 3.

The upper wound tape 8 contains, for example, polyimide, mica, magnesium hydroxide, or aluminum hydroxide as a flame-retardant inorganic substance. A thickness of the upper wound tape 8 is, for example, 0.3 mm.

According to the third modification, since the upper wound tape 8 containing the flame-retardant inorganic substance is disposed between the sheath 4 and the plurality of optical fiber ribbons 2, the optical fiber cable 1D high in flame retardance may be provided.

Fourth Modification of First Embodiment

An optical fiber cable 1E according to a fourth modification of the first embodiment will be described with reference to FIG. 6. The same components as those of the optical fiber cable 1A according to the first embodiment are denoted by the same reference numerals, and description thereof will be omitted.

Figure 6:
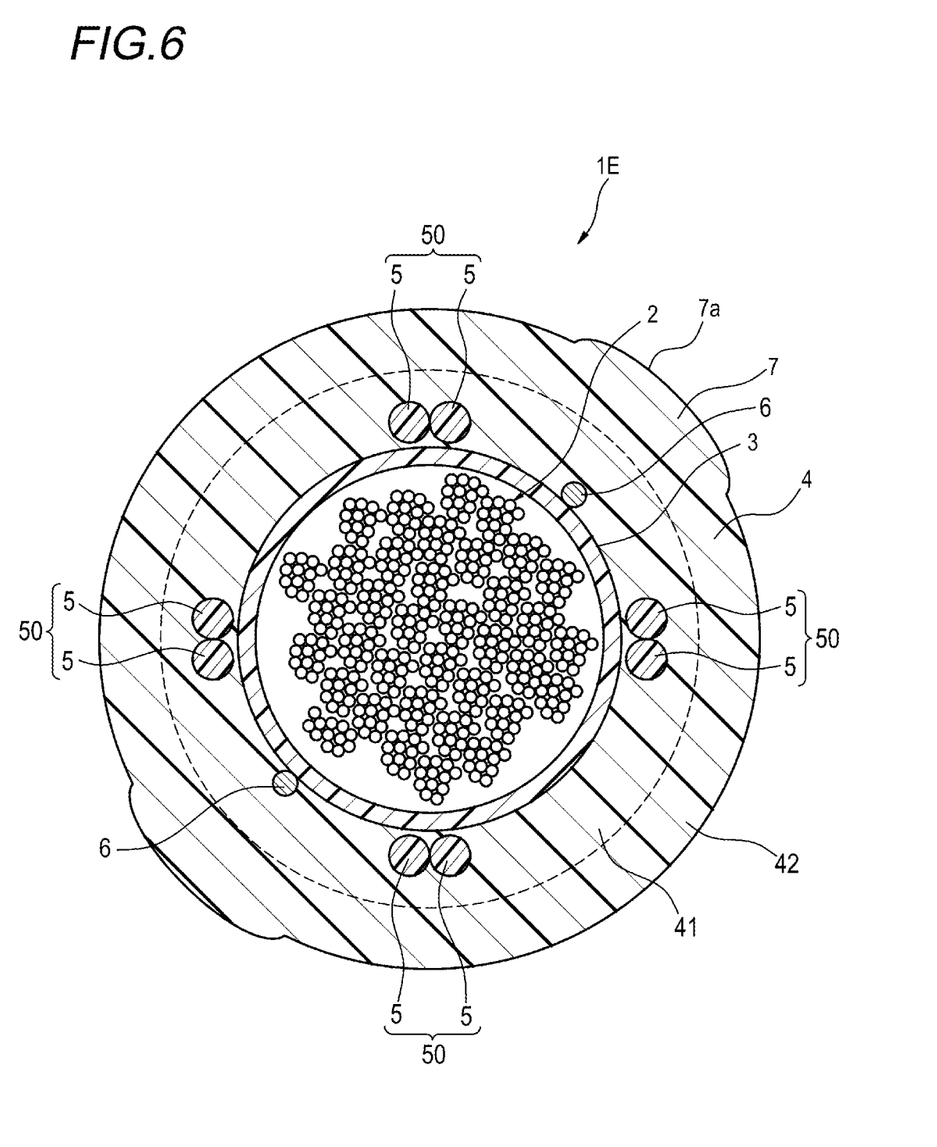
FIG. 6 is a cross-sectional view of an optical fiber cable according to a fourth modification of the first embodiment.

FIG. 6 is a cross-sectional view perpendicular to a longitudinal direction of the optical fiber cable 1E. As shown in FIG. 6, in addition to the configuration of the optical fiber cable 1B according to the first modification, the optical fiber cable 1E further includes the sheath 4 including an inner layer 41 and an outer layer 42.

The inner layer 41 of the sheath 4 is provided to cover the plurality of optical fiber ribbons 2 from outside and to enclose the plurality of tensile strength member sets 50. The plurality of tensile strength member sets 50 and the tearing strings 6 are embedded in the inner layer 41 of the sheath 4. The inner layer 41 of the sheath 4 contains, for example, magnesium hydroxide or aluminum hydroxide as a flame-retardant inorganic substance. A thickness of the inner layer 41 is, for example, 1.0 mm.

The outer layer 42 of the sheath 4 is provided to cover the inner layer 41 from outside. The protrusions 7 are provided on an outer peripheral portion of the outer layer 42. The outer layer 42 of the sheath 4 contains, as a release agent, a silicon-based release agent such as silicon or siloxane. A thickness of the outer layer 42 is, for example, 0.5 mm.

In the present example, the distance d from a position on an outer periphery of one tensile strength member set 50 to a surface layer of the outer layer 42 is 0.5 mm or more. Here, the position on the outer periphery of the tensile strength member set 50 is the same as the position on the outer periphery described in the first modification.

As described above, in the present modification, since the inner layer 41 contains the flame-retardant inorganic substance, the optical fiber cable 1E excellent in flame retardance may be provided. In addition, since the outer layer 42 contains the release agent, the optical fiber cable 1E may be smoothly fed even in a duct during air pressure feeding. Accordingly, the wiring is facilitated. Further, since the distance d from the position on the outer periphery of one tensile strength member set 50 to the surface layer of the outer layer 42 is 0.5 mm or more, the flame retardance of the optical fiber cable 1E is further improved.

(Evaluation Experiment)

Figure 7:
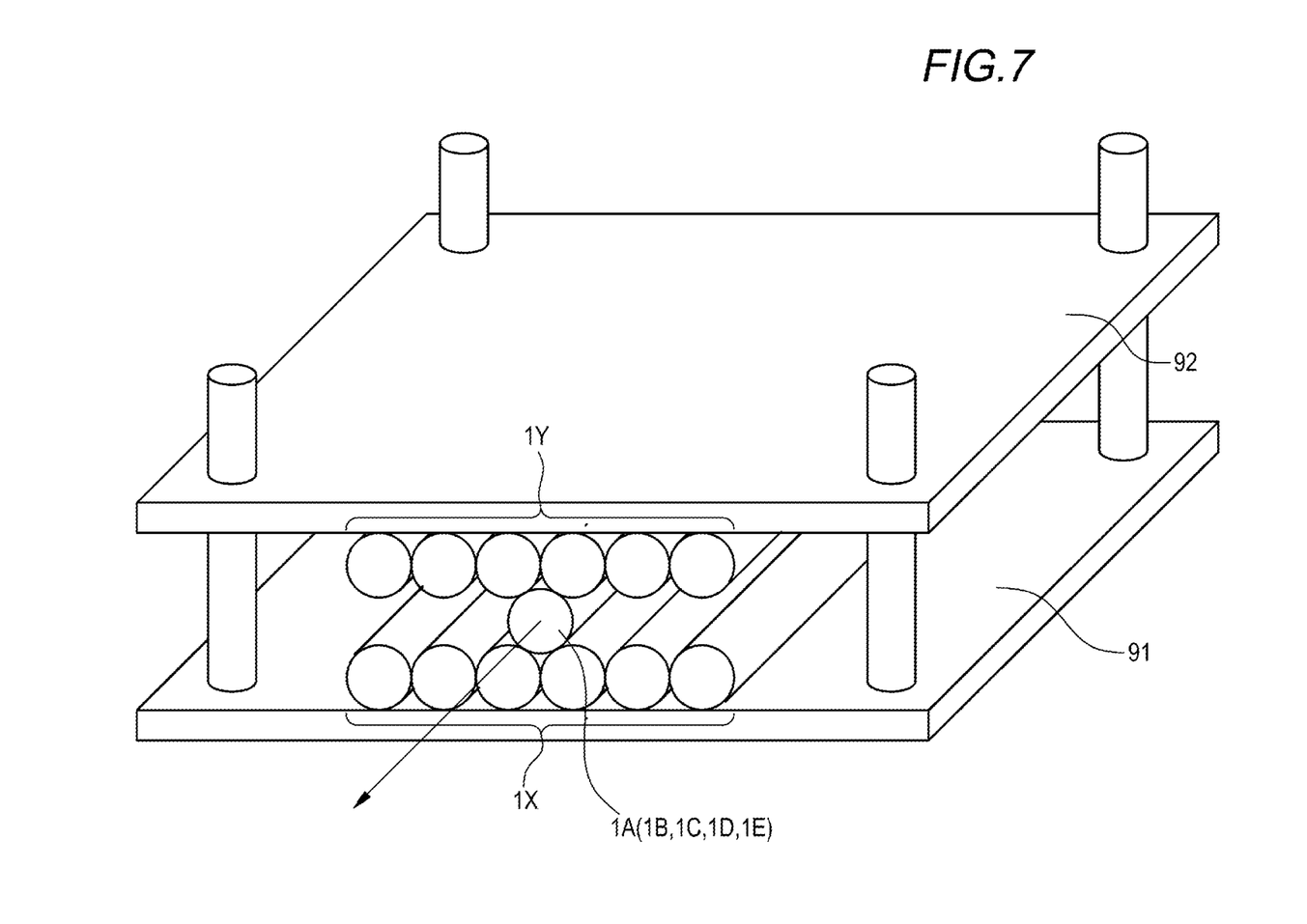
FIG. 7 is a schematic diagram showing an experiment for measuring dynamic friction coefficients of the optical fiber cables of the present disclosure.

Dynamic friction coefficients of the optical fiber cables 1A, 1B, 1C, 1D, and 1E according to the first embodiment and the modifications were evaluated. FIG. 7 is a schematic diagram of an experiment for measuring the dynamic fric- Further, flame retardance of each of the optical fiber cables 1A, 1B, 1C, 1D, and 1E according to the first embodiment and the modifications was evaluated. As a method for evaluating the flame retardance, a test according to the standard defined by European Construction Products Regulation (CPR) was used. Evaluation results are shown in Table 1.

TABLE 1

| Sample No. | 1 | 2 | 3 | 4 | 5 | 6 |
|---|---|---|---|---|---|---|
| Sample structure | Optical fiber cable 1B | Optical fiber cable 1A | Optical fiber cable 1B | Optical fiber cable 1C | Optical fiber cable 1D | Optical fiber cable 1E |
| Sheath configuration | Flame-retardant HDPE(30 wt % of magnesium hydroxide, and 2 wt % of silicon) | Flame-retardant HDPE(30 wt % of magnesium hydroxide, and 2 wt % of silicon) | Flame-retardant HDPE(30 wt % of magnesium hydroxide, and 2 wt % of silicon) | Flame-retardant HDPE(30 wt % of magnesium hydroxide, and 2 wt % of silicon) | Flame-retardant HDPE(30 wt % of magnesium hydroxide, and 2 wt % of silicon) | Inner layer: flame-retardant HDPE(30 wt % of magnesium hydroxide) Outer layer: non-flame-retardant HDPE(2 wt % of silicon) |
| Sheath | 1.5 mm | 1.5 mm | 1.5 mm | 1.5 mm | 1.5 mm | Inner layer: 1.5 mm Outer layer: 0.5 mm |
| Distance (d) from position on outer periphery of tensile strength member to surface layer of sheath | 0.3 mm | 0.5 mm | 0.5 mm | 0.5 mm | 0.5 mm | 0.5 mm (to surface layer of inner layer) |
| Absence or presence of upper wound tape | No | No | No | No | Yes | No |
| Evaluation result | Eca | Dca | Dca | Dca | Cca | Dca | tion coefficient of each optical fiber cable. As shown in FIG. 7, first, a plurality of optical fiber cables are attached adjacently on a lower plate 91 to form one optical fiber cable set 1X. The plurality of optical fiber cables are the same type as the optical fiber cables to be measured, and are the optical fiber cables 1A, 1B, 1C, 1D, and 1E. Further, similarly to the optical fiber cable set 1X, another optical fiber cable set 1Y in which a plurality of optical fiber cables of other types are arranged adjacently and bundled is attached in parallel to an upper plate 92. In this state, one optical fiber cable (1A, 1B, 1C, 1D, 1E) to be measured is sandwiched between the lower plate 91 and the upper plate 92 (between the optical fiber cable set 1X and the optical fiber cable set 1Y), and a load of 2 kg (19.6 N) is applied vertically and uniformly to the upper plate 92. In a state where the load was applied, the one optical fiber cable to be measured was pulled at a tensile speed of 500 m/min, and tension at the start of movement was measured. A sample length of each optical fiber cable is 300 mm. As a result of the measurement experiment, it was confirmed that each of the optical fiber cables 1A, 1B, 1C, 1D, and 1E had a dynamic friction coefficient of 0.25.

In addition, pressure feeding distances of the optical fiber cables 1A, 1B, 1C, 1D, and 1E according to the first embodiment and the modifications were evaluated. As a method of evaluating the pressure feeding distance, a micro duct pressure feeding test defined by International Electrotechnical Commission (IEC) was used. In the pressure feeding test, a general-purpose micro duct was used. An inner diameter of the duct is 20 mm. A total pressure feeding distance in the duct is set to 1000 m or more, and the duct is folded back every 100 m. A radius of curvature of the duct is 40 times an outer diameter of the duct. A pressure in the duct is 1.3 MPa to 1.5 MPa. As a result of the measurement experiment, it was confirmed that the pressure feeding distance of each of the optical fiber cables 1B, 1C, 1D, and 1E was 1000 m or more, but the pressure feeding distance of the optical fiber cable 1A was slightly less than 1000 m.

In Table 1, Sample No. 1 is a comparative example. A basic configuration of a cable of Sample No. 1 is the same as that of the optical fiber cable 1B according to the first modification, but the distance d from one tensile strength member set 50 to the surface layer of the sheath 4 is 0.3 mm. Sample No. 2 is the optical fiber cable 1A according to the first embodiment, the number of the tensile strength members 5 is four, and the distance d from a position on the outer periphery of one tensile strength member 5 (the tensile strength member set 50) to the surface layer of the sheath 4 is 0.5 mm. Sample No. 3 is the optical fiber cable 1B according to the first modification, and the distance d from one tensile strength member set 50 to the surface layer of the sheath 4 is 0.5 mm. Sample No. 4 is the optical fiber cable 1C according to the second modification, and the distance d from one tensile strength member set 50 to the surface layer of the sheath 4 is 0.5 mm. Sample No. 5 is the optical fiber cable 1D according to the third modification, the upper wound tape 8 containing the flame-retardant inorganic substance with a thickness of 0.3 mm is provided, and the distance d from one tensile strength member set 50 to the surface layer of the sheath 4 is 0.5 mm.

Sample No. 6 is the optical fiber cable 1E according to the fourth modification, the sheath 4 includes the inner layer 41 and the outer layer 42, and the distance d from one tensile strength member set 50 to the surface layer of the inner layer 41 is 0.5 mm. The thickness of the inner layer was 1.0 mm, and the thickness of the outer layer was 0.5 mm. To the sheath of Sample No. 1 to Sample No. 5, 30 wt % of magnesium hydroxide was added as the flame-retardant inorganic substance, and 2 wt % of silicon was added as the release agent. In Sample No. 6, 30 wt % of magnesium hydroxide was added as the flame-retardant inorganic substance to the inner layer 41, and 2 wt % of silicon was added as the release agent to the outer layer 42.

The flame retardance is evaluated in a class of seven stages including Aca, B1ca, B2ca, Cca, Dca, Eca, and Fca, and Aca means highest flame retardance and Fca means lowest flame retardance. As a result of the evaluation experiment, the sample No. 1 was classified as class Eca, and the flame retardance was the lowest. Sample No. 2 to Sample No. 4, and Sample No. 6 were classified as class Dca, and good flame retardance was confirmed. Sample No. 5 was classified as class Cca, and highest flame retardance was confirmed.

Although the present disclosure is described in detail with reference to a specific embodiment, it will be apparent to those skilled in the art that various changes and modifications may be made without departing from the spirit and scope of the present disclosure. The numbers, positions, shapes or the like of components described above are not limited to the above embodiment, and may be changed to suitable numbers, positions, shapes or the like during carrying out the present disclosure.

REFERENCE SIGNS LIST 1A to 1E: optical fiber cable
2: optical fiber ribbon
3: water absorbing tape
4: sheath
5: tensile strength member
6: tearing string (fibrous filler)
7: protrusion
7a: surface
8: upper wound tape
91: lower plate
92: upper plate
11A to 11L: optical fiber
12: connected portion
13: non-connected portion
14: connecting resin
41: inner layer
42: outer layer
50: tensile strength member set

What is claimed is:

1. An optical fiber cable comprising:
a plurality of optical fibers;
a tensile strength member set that is disposed along the plurality of optical fibers in a longitudinal direction of the optical fiber cable; and
a sheath that covers the plurality of optical fibers from outside and encloses the tensile strength member set in the sheath,
wherein the tensile strength member set comprises at least four tensile strength member sets embedded in the sheath in a state where the at least four tensile strength member sets are apart from each other in a radial direction of the optical fiber cable,
each of the at least four tensile strength member sets includes two tensile strength members that are paired,
the sheath includes an outer layer and an inner layer,
the inner layer includes a flame-retardant inorganic substance,
the outer layer includes a release agent,
the tensile strength member set is included in the inner layer, and
a distance from one of the at least four tensile strength member sets to a surface layer of the sheath is 0.5 mm or more.

2. The optical fiber cable according to claim 1, wherein the sheath contains magnesium hydroxide or aluminum hydroxide as the flame-retardant inorganic substance.

3. The optical fiber cable according to claim 1, wherein the at least four tensile strength member sets are arranged at equal intervals in a radial direction of the optical fiber cable.

4. The optical fiber cable according to claim 1 further comprising at least one fibrous filler that is disposed along the plurality of optical fibers in the longitudinal direction,
wherein the at least four tensile strength member sets are arranged in line symmetry with respect to a straight line passing through the fibrous filler and a center of the optical fiber cable in a cross-sectional view of the cable.

5. The optical fiber cable according to claim 1 further comprising an upper wound tape that covers the plurality of optical fibers from outside,
wherein the upper wound tape contains the flame-retardant inorganic substance, and
the upper wound tape is disposed between the sheath and the plurality of optical fibers.

6. The optical fiber cable according to claim 1, wherein each the plurality of optical fibers is formed in a form of an intermittent-connection-type optical fiber ribbon in which, in a state where the plurality of optical fibers are arranged adjacently in a direction orthogonal to a longitudinal direction of the plurality of optical fibers, a connected portion in a state where adjacent optical fibers are connected and a non-connected portion in a state where adjacent optical fibers are not connected are intermittently provided in the longitudinal direction of the plurality of optical fibers in a part or all of the plurality of optical fibers.

7. An optical fiber cable comprising:
a plurality of optical fibers;
at least four tensile strength member sets each being disposed along the plurality of optical fibers in a longitudinal direction of the optical fiber cable; and
a sheath that covers the plurality of optical fibers from outside and encloses the at least four tensile strength member sets in the sheath,
wherein the at least four tensile strength member sets are embedded in the sheath in a state where the at least four our tensile strength member sets are apart from each other in a radial direction of the optical fiber cable,
each of the at least four tensile strength member sets includes two tensile strength members that are paired,
the sheath includes an outer layer and an inner layer,
the inner layer includes a flame-retardant inorganic substance,
the outer layer includes a release agent,
the tensile strength member set is included in the inner layer, and
a distance from one of the at least four tensile strength member sets to a surface layer of the sheath is 0.5 mm or more.

8. The optical fiber cable according to claim 7, wherein the tensile strength member set is the two tensile strength members that are paired in a state of being in contact with each other.

* * * * *